March 10, 1942. J. W. DAWSON 2,275,948
ELECTRONIC SPOT WELDING CONTROL MEANS
Filed Jan. 28, 1938
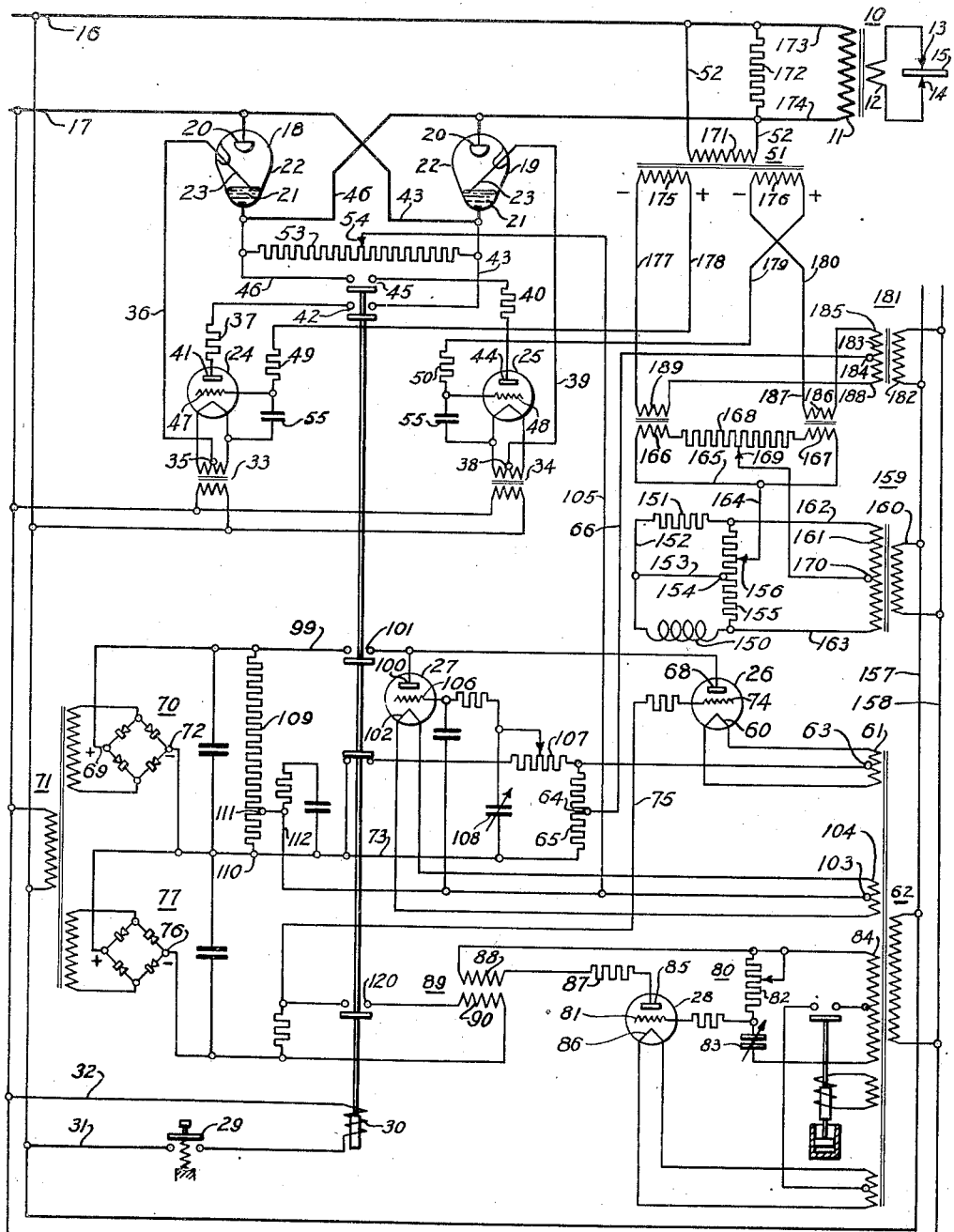
WITNESSES:
N. F. Susser
R.W. Bailey
INVENTOR
John W. Dawson.
BY
F. W. Lyle
ATTORNEY Patented Mar. 10, 1942

2,275,948

UNITED STATES PATENT OFFICE 2,275,948

ELECTRONIC SPOT WELDING CONTROL MEANS

John W. Dawson, Auburndale, Mass., assignor to Westinghouse Electric & Manufacturing Company, East Pittsburgh, Pa., a corporation of Pennsylvania Application January 28, 1938, Serial No. 187,485

11 Claims. (Cl. 250—27)

My invention relates to an electric power system, and especially to electric power systems for welding.

An object of my invention is to provide a system having a control electrode in a discharge device having applied thereto a potential controlling both the timing and the heat for a welding or other load circuit.

Another object of my invention is to provide a common D.-C. type timing control circuit electrically connected and operating with discharge devices and means eliminating all A.-C. voltage components in said voltage excepting the added phase shift component.

Other objects and advantages will be apparent from the following description and claims in which the single figure is a diagrammatic circuit embodying my invention.

In illustrating the application of my invention to a preferred embodiment, I have illustrated portions of circuits described in connection with other applications which I have filed in the Patent Office although the invention is not to be construed as limited to these particular forms. As stated above, I desire to apply both the timing circuit and the phase shift circuit or heat control to the same control electrode and I also desire to energize these circuits from the alternating current lines but to cancel out the alternating voltage component in the application of these circuits to the control electrode. For the timing circuit I have illustrated the circuit more particularly explained in my copending application Serial No. 142,564 for Welding timing circuits, filed May 14, 1937, now Patent No. 2,189,601. The phase shift circuit which is more commonly referred to in the welding art as the heat control circuit, I have more particularly described in my Patent No. 2,083,190, issued June 8, 1937, on Welding apparatus.

Referring to the figure of the drawing, the reference character 10 designates generally a welding transformer having a primary winding 11 and a secondary winding 12. The secondary winding 12 is connected to the customary welding circuit in which the welding electrodes 13, 14 are diagrammatically represented applied to objects 15 which are to be welded together. The primary winding 11 of the transformer is connected by means of conductors 16 and 17 to a source of alternating current.

In order to control the application of the welding current from the source of alternating current to the transformer 10, vapor electric devices shown generally at 18 and 19 are provided. The devices 18 and 19 are of the mercury vapor type having an anode 20 and a mercury pool 21 as a cathode in the bottom of a container 22. In order to render the vapor electric devices 18 and 19 conducting, a starting electrode 23 is provided.

Although other types of starting electrodes may be utilized, I prefer to use a high resistance electrode immersed in the mercury and composed of carborundum or boron carbide. This type of starting electrode is well known in the art and is more specifically described in Patent 2,069,283, issued February 2, 1937, to Slepian.

The two devices 18 and 19 are disclosed in order that both directions of the alternating current may be controlled in the application to the welding circuit since each device acts as a rectifier as well as being a controllable conductor.

When a certain amount of current is caused to flow through the starting electrode 23 into the mercury pool 21, a cathode spot is formed which furnishes a source of electrons which in turn causes ionization of the mercury vapor within the container 21 and, under the influence of positive anode potential, the tube becomes conducting. Thus, it is only necessary to pass sufficient starting current through the starting or ignition electrode 23 to form the cathode spot at a predetermined time in the proper half cycle in the alternating current wave to render the vapor electric devices conducting for the remainder of that particular half cycle. In order to conduct succeeding half cycles of alternating current, the vapor electric devices 18 and 19 are connected inversely. That is, the anode 20 of devices 18 is connected to the cathode 21 of device 19 and the anode 20 of device 19 is connected to the cathode 21 of device 18. It will, therefore, be evident that if the vapor electric devices 18 and 19 are energized in turn during successive half cycles, current from the source of alternating current will flow to the transformer 10 as long as this condition is maintained.

The following timing control system is as previously mentioned taken from the specific circuit illustrated and described in my copending application Serial No. 142,564, filed May 14, 1937, for Welding timing circuits, now Patent No. 2,189,601.

The timing control system, as described in this copending application, involves the utilization of control tubes for supplying ignition current to control the discharge in the tubes 18 and 19 and also electronic devices for accurately operating and stopping the operation of these tubes at predetermined points on the half cycles of alternating current. In the preferred embodiment illustrated, I utilize tubes 24 and 25 for controlling the discharge in the devices 18 and 19 through the igniter or starter 23 and then I utilize a starting tube 26, a cut-off tube 27 for the discharge and in addition for starting the discharge at a predetermined point on the first half cycle of the power period a further tube 28. The application of this control system is preferably instituted by an externally operated switch 29 which may be operated manually or by a cam on the welding machine. In other words, when the operator desires to perform the welding operation, he depresses the switch 29, energizing the relay 30 from the conductors 31, 32 connected to the source of alternating current. The relay 30, in turn, operates various individual switches hereinafter referred to in the description of the control circuit.

The cathodes of the tubes 24 and 25 are energized from the alternating current circuit by transformers 33 and 34, respectively. The midpoint of the secondary of the transformer 33, namely 35, has a connection 36 extending to the igniter or starter 23 of tube 18. Likewise, the midpoint 38 of the secondary of transformer 34 is connected through connection 39 to the starting electrode 23 of the tube 19. The anode 41 of tube 24 is connected through resistance 37 and switch point 42 of the starting relay 30 to the connection 43 to the anode 20 of tube 18. The anode 44 of tube 25 is likewise connected through resistance 40 and switch 45 of the relay 30 to the connection 46 to the anode 20 of tube 19. The grids 47 and 48 of tubes 24 and 25 are connected through suitable resistances 49 and 50 to secondaries of transformer 51 hereafter described which is connected by the connections 52 across the primary 11 of welding transformer 10. The cathodes of tubes 24 and 25 may be energized from the alternating current lines 16 and 17. Between the conductors 43 and 46 extending to the cathodes and anodes of the tubes 18 and 19 previously described is a resistance 53. The voltage drop across the resistance is the voltage drop across the tubes 18 and 19. The variable tap 54 on this resistor is to compensate for any slight difference between the tubes 18 and 19 in operation. The further function of this resistance 53, together with the windings of transformer 51 and the transformer windings of the phase shifting or heat control circuit hereafter described is to nullify the alternating-current component before and after firing the tubes which would otherwise exist on the grids 47 and 48 of tubes 24 and 25, because of their circuit locations. Resistances 49 and 50 are to limit grid currents. Condensers 55 prevent faulty operation of tubes due to electrostatic pick up of grid by the anode.

Tube 26 is utilized as a starting device. Its cathode 60 is energized through the secondary 61 of transformer 62 and the midpoint 63 of this secondary is connected through the midpoint 64 of resistance 65 and connections 66 through the phase-shift or heat control circuit hereafter described to the grids 47 and 48 of the tubes 24 and 25. The anode 68 of tube 26 is connected through contact 101 to the positive terminal 69 of a source of direct current potential disclosed as the rectifier bridge 70 connected to a transformer 71 energized from the source of alternating current. The negative terminal 72 is connected through conductor 73 to the resistance 65, cathode transformer secondary 61 and cathode 60. The grid 74 of tube 26 is connected through a connection 75 to the negative terminal 76 of a similar rectifier bridge 77 also energized by the alternating-current source. These rectifier bridges are preferably of the well known copper oxide dry plate type. The negative potential from the rectifier bridge 77 on the grid 74 constitutes a discharge preventing bias normally applied to the control electrode of the starting tube 26.

The operation of the starting tube 26 is controlled by means of the timing tube 28 previously referred to which controls the point of initiation of tube 26 with respect to the voltage wave. This timing tube 28 is preferably of the hot cathode gaseous discharge type and is provided with a phase shifting control circuit 80 for the grid 81 of the tube. This phase shifting control circuit comprises an adjustable resistor 82 and an adjustable capacitor 83. The phase shifting circuit 80 is connected by means of the transformer secondary 84 to the same source of alternating current as is applied to the anode 85 and cathode 86 of the timing tube 28. Alternating current for the timing tube 28 is provided from the transformer secondary 84. The output of timing tube 28 is applied to a circuit comprising the resistor 87 and a winding 88 of a transformer 89. The secondary winding 90 of the transformer 89 is indirectly connected to the grid 74 of the starting tube 26 when the switch 120 of relay 30 is closed through the connection 75 which, as previously described, normally applies a negative discharge preventing potential to this grid 74.

The phase shifting circuit 80 is adjusted by means of the variable resistor 82 and variable capacitor 83 to render the start tube 26 conducting at the desired point in the cycle of operation of the alternating current source. The phase shifting circuit 80 will determine the exact point on the voltage wave that the tube 28 will be rendered conducting. The discharge in tube 28 permits current to flow through the primary winding 88 of transformer 89 and due to the steep wave front of the current applied, a sharp voltage surge will appear in the secondary winding 90 which will be applied, in turn, to the grid 74 of the starting tube 26. The peak value of the surge is sufficient to overcome the negative potential of the source 77 and to positively bias the grid 74, thereby rendering the start tube 26 conducting. As soon as the start tube 26 becomes conducting, a positive potential is applied to the control tubes 24 and 25 and they will then function to establish the conductivity of tubes 18 and 19.

It will be noted that the cut-off space discharge device 27 has its anode 100 connected through switch 101 to the same positive terminal of the rectifier bridge 70 as the anode 68 of the starting tube 26. The cathode 102 of the cut-off tube 27 is connected through the midpoint 103 of the transformer secondary 104 by means of a connection 105 to the midpoint 54 of the resistance 53 across the anodes and cathodes of the tubes 18 and 19. The grid 106 of cut-off tube 27 is connected through adjustable resistance 107 to the cathode circuit 60 of the starting tube 26. An adjustable timing condenser 108 is connected to the cathode circuit 63 of starting tube 26 and conductor 73 extending from the negative terminal of the direct-current rectifier bridge 70 to the resistance 65. The resistance or voltage divider 109 extends from the connection 99 between the anodes of tubes 26 and 27 to the point 110 on the conductor 73 connected to the grid 106 of tube 27. A tap 111 is taken from a point on the potentiometer and by means of connection 112 is applied to the cathode 102 of the cut-off tube 27. It will be noted that the point 110 with respect to point 111 corresponds to the negative grid potential of the cut-off tube 27. The point 111 corresponds to the cathode potential of the tube 27.

The conduction of the tube 26 will apply potential across the resistor 65 and this potential acts to charge the condenser 108 through the variable resistance 107. After a time variable between adjustment of resistor 107, condenser 108 is sufficiently charged to raise the grid 106 of tube 27 to its breakdown point with respect to its cathode 102. With the breakdown of this tube positive potential is fed through the tube and its cathode transformer to wire 105 which action again throws the bias on the control tubes 24 and 25 to a negative value stopping the further ignition of the tubes 18 and 19 and hence further welding current after the termination of the particular half cycle. Leads 66 and 105 are the timing circuit output leads.

When neither tube 26 nor 27 is ignited, the lead 66 is negative to lead 105. When the starting tube 26 discharges, the lead 66 becomes positive and the lead 105 becomes negative. When the stop tube ignites, the lead 66 again becomes negative in respect to the lead 105. During the period while lead 66 is positive in respect to lead 105, welding current can flow.

The phase shift or heat control circuit which I desire also to apply to the control grids 47 and 48 of the discharge tubes 24 and 25 is more particularly described in my Patent 2,083,190, issued June 9, 1937. This phase shift circuit comprises an inductor 150 and a resistor 151 connected by conductor 152 and a connection 153 between the inductor and the resistor extending to the midpoint 154 of a potentiometer 155 connecting the other two ends of the inductor and resistor. An adjustable connection 156 to the potentiometer varies the amount of the cycle and consequently the heat of the alternating current occurring at the weld 13, 14, 15.

I prefer to energize this phase shift or heat control portion from the lines 157, 158 by means of a transformer 159 having a primary 160 and a secondary 161. The two ends 162, 163 of the secondary 161 are connected to the ends of the potentiometer 155. The adjustable contact 156 is connected by conductor 164 to a line 165 connected to ends of the windings 166 and 167. These windings 166 and 167 are connected by a resistor 168 with an adjustable substantially midpoint connection 169 extending to the midpoint 170 on the secondary 161 that energizes the phase shift circuit.

As previously described, a transformer 51 is connected in the circuit adjacent the primary 11 of the welding transformer 10. The primary 171 of this transformer is preferably connected across a resistance 172 between the lines 173 and 174 adjacent the primary 11 of the welding transformer. The transformer 51 has two secondaries 175 and 176 with connections 177, 178, 179, 180 making the potentials of conductors 177 and 178 reversed respectively to that of conductors 179 and 180. Another transformer 181 has its primary 182 energized from the alternating current lines 157 and 158 extending to the alternating current source 16 and 17. The secondary 183 has its midpoint 184 connected to connection 66 which is one of the control leads from the timing circuit previously described. One end 185 of this secondary is connected to the primary winding 186 associated with the winding 167 which is connected to the potentiometer 155 of the phase shift circuit. The other end 187 of this primary 186 is connected to the secondary 176 of the transformer 51 connected adjacent the welding transformer. The other end 188 of the secondary 183 is connected to the primary winding 189 associated with the secondary 166 also connected to the potentiometer 155 of the phase shift circuit. The other end of this primary 189 is connected by conductor 177 to the secondary 175 previously described. The connection 178 extends to the grid or other type of control electrode 47 in the control tube 24 and conductor 179 extends to the grid or other type of control electrode 48 in the control tube 25.

It will be noted that my invention applies both the timing circuit and the phase shift or heat control circuit to the same control electrodes. If only half a wave is to be delivered, only one tube 24 and a discharge tube 18 or its equivalent would be utilized. However, two tubes 24 and 25, are commonly employed to obtain full wave control.

As previously stated, one of the objects of my invention is to cancel out of the grid circuits of discharge devices 24 and 25, the voltage component of the alternating current supply circuit. It is important to remember that the voltage across conductors 16 and 17 is the full line voltage and that the tubes 18 and 19 subtract a certain voltage drop from the alternating current line. The remainder is the voltage drop across the primary 11 of the welding transformer or in other words the voltage drop between the connections 173, 174 to the alternating supply circuit and to the tubes. The voltage drop through the tubes is represented by the voltage drop across the resistance 53. The voltage drop across the lines 16, 17 is also represented by the voltage drop across the transformer 181 and the voltage drop across the welding primary is represented by the voltage drop across the transformer 51. If the voltage of conductors 16, 17 is for instance 100 volts, that would mean 100 volts at the transformer 181 and a 50 volt drop on either side of the midpoint 184 of the secondary 183. If the tubes 18 and 19 had a 10 volt drop when fired, then that would mean a 10 volt drop across the resistance 53 with 5 volt drop on either side of the midpoint 54. There would, accordingly, be a 90 volt drop across the connections 173, 174 of the welding transformer and this would mean a 45 volt drop in each of the secondaries 175 and 176 of the transformer 51. These secondaries 175 and 176 are so connected that the 45 volt drop therethrough adds up with the 5 volt drop through one side of the resistance 53 to cancel out the 50 volt drop through one side of the secondary 183 of the transformer 181. By these connections the alternating voltage component is cancelled out in the application of the timing and phase shift circuit to the control electrode in the control tubes for the electric power applied to the welding circuit.

It is apparent that many modifications may be made in the type of circuit elements and their various combinations and also in the type of application of the invention. Accordingly, I desire only such limitations applied to the following claims as are necessitated by the prior art.

I claim as my invention:
1. An electric power system for supplying current, comprising, in combination, a source of alternating current, electric valve means having a voltage drop connected to said alternating current, control means for said electric valve, timing means for said control means energized from the line voltage of said alternating current source, a load circuit having the remainder of the line voltage applied thereto, and means applying to said timing means the voltage drop through the electric valve means and the remainder of said line voltage in opposite sign of said line voltage as applied for energizing said timing means whereby the alternating voltage component is canceled from said timing means.

2. In combination with an alternating-current line and a load to be fed with alternating current therefrom, a pair of electrical discharge tubes having control circuits connected to like electrodes therein and connected back to back, means to impress one control voltage component from a single source on both control circuits, means to impress a voltage component derived from said line on said control circuits, and means to neutralize the last-named voltage component with a voltage proportional to that at the load terminals.

3. In combination with an alternating-current line and a load to be fed with alternating current therefrom, a pair of electrical discharge tubes having control circuits connected to like electrodes therein and connected back to back, means to impress one control voltage component from a single source on both control circuits, means to impress a control voltage component on each control circuit from a source individual thereto, means to impress a voltage component derived from said line on said control circuits, and means to neutralize the last-named voltage component with a voltage proportional to that at the load terminals.

4. In combination with an alternating-current line and a load to be fed with alternating current therefrom, a pair of electrical discharge tubes having control circuits connected to like electrodes therein and connected back to back, means to impress one control voltage component from a single source on both control circuits, means to impress a control voltage component on each control circuit from an alternating source individual thereto, means to impress a voltage component derived from said line on said control circuits, and means to neutralize the last-named voltage component with a voltage proportional to that at the load terminals.

5. In combination with an alternating-current line and a load to be fed with alternating current in intermittent periods of a few cycles duration therefrom, a pair of electrical discharge tubes having control circuits connected to like electrodes therein and connected back to back, means to impress one control voltage component from a single source on both control circuits, means to impress a voltage component derived from said line on said control circuits, and means to neutralize the last-named voltage component with a voltage proportional to that at the load terminals.

6. In combination with an alternating-current line and a load to be fed with alternating current therefrom, a pair of electrical discharge tubes having control circuits connected to like electrodes therein and connected back to back, means to impress one control voltage component from a single direct-current source on both control circuits, means to impress a voltage component derived from said line on said control circuit, and means to neutralize the last-named voltage component with a voltage proportional to that at the load terminals.

7. In combination with an alternating-current line and a load to be fed with alternating current in intermittent periods of a few cycles duration therefrom, a pair of electrical discharge tubes having control electrode circuits connected to like electrodes therein and connected back to back, means to impress one control voltage component from a single direct-current source on the control circuits of both tubes, means to impress a voltage component derived from said line on the control circuit of each tube, and means to neutralize the last-named component with the voltage which is proportional to that at the terminals of said load.

8. In combination with an alternating-current line and a load to be fed with alternating current in intermittent periods of a few cycles duration therefrom, a pair of electrical discharge tubes having control electrode circuits connected to like electrodes therein and connected back to back, means to impress one control voltage component from a single direct-current source on the control circuits of both tubes, means to impress a control voltage component on each control circuit from a source individual thereto, means to impress a voltage component derived from said line on the control circuit of each tube, and means to neutralize the last-named component with the voltage which is proportional to that at the terminals of said load.

9. In combination with an alternating-current line and a load to be fed therefrom with alternating current in intermittent periods of a few cycles duration, a pair of electrical discharge tubes of the igniter-electrode type connected back to back between said line and said load, means to impress one control voltage component from a single source on the igniter-electrode circuits of both tubes, means to impress an individual voltage component derived from said line on the igniter-electrode circuit of each tube, and means to neutralize the last-named voltage component with a voltage proportional to that at the terminals of said load.

10. An electric power system comprising, in combination, a load circuit, circuit means connecting the load circuit to a source of alternating-current, means including a discharge device connected to control the flow of current in said load circuit, a control electrode in said discharge device, means for rendering said last-mentioned means conducting during periods comprising a predetermined number of voltage half cycles of the alternating current to supply current for the time corresponding to said predetermined number of half cycles and non-conducting during the intervening periods and purely electrical means embodying an auxiliary voltage source connected to said source for rendering said discharge device means conducting at a predetermined time in any of said half cycles of the alternating voltage to control the power which flows into said load circuit during the time corresponding to said predetermined number of half cycles, said last two mentioned means being connected to said control electrodes of said discharge device, and means connected to the terminals of said load for opposing said auxiliary voltage source.

11. An electric power system for supplying current comprising, in combination, a load, circuit means connecting said load to a source of alternating current, a discharge device to control the flow of current in said load, a control electrode for said discharge device, timing means and current control means energized by alternating current operatively connected to said control electrode and means cancelling the alternating voltage components in the timing and current control means operatively connected to said control electrode.

JOHN W. DAWSON.